(12) United States Patent
Petersen

(10) Patent No.: US 6,338,191 B1
(45) Date of Patent: Jan. 15, 2002

(54) SECUREMENT OF HEAD RESET SUPPORT INTO AUTOMOBILE SEAT FRAME

(75) Inventor: Horst Udo Petersen, Kitchener (CA)

(73) Assignee: Bend All Automotive Incorporated, Ayr (CA)

(*) Notice: Subject to any disclaimer, the term of this patent is extended or adjusted under 35 U.S.C. 154(b) by 0 days.

(21) Appl. No.: 09/518,207

(22) Filed: Mar. 3, 2000

Related U.S. Application Data

(63) Continuation-in-part of application No. 09/064,620, filed on Apr. 23, 1998, now Pat. No. 6,035,516.

(30) Foreign Application Priority Data

Apr. 25, 1997 (GB) .............................................. 9708394

(51) Int. Cl.[7] .............................................. B21D 39/00
(52) U.S. Cl. .............................. 29/523; 29/509; 29/515; 297/452.18
(58) Field of Search ......................... 29/505, 509, 523, 29/520, 515, 243.517, 243.5, 282, 283.5; 297/410, 452.18, 391

(56) References Cited

U.S. PATENT DOCUMENTS 6,035,516 A  *  3/2000  Petersen ....................... 29/523

* cited by examiner

*Primary Examiner*—S. Thomas Hughes
*Assistant Examiner*—Jermie E. Cozart
(74) *Attorney, Agent, or Firm*—Anthony Asquith & Co.

(57) ABSTRACT

The headrest support tubes are secured to the seat frame member not by the usual welding, but by gripping the web of the member between two rings or lock-beads swaged into the metal of the tube. The first ring is swaged-out by compressing the tube. The tube, with the one ring, is then assembled into a through-hole in the web of the frame member. Then, the second ring is swaged into the metal of the tube, on the other side of the web, and the web lies gripped between the rings. The seat frame member may be an I-section extrusion, or a round tube with localized squeezed-flat areas, flanked by flanges.

12 Claims, 7 Drawing Sheets

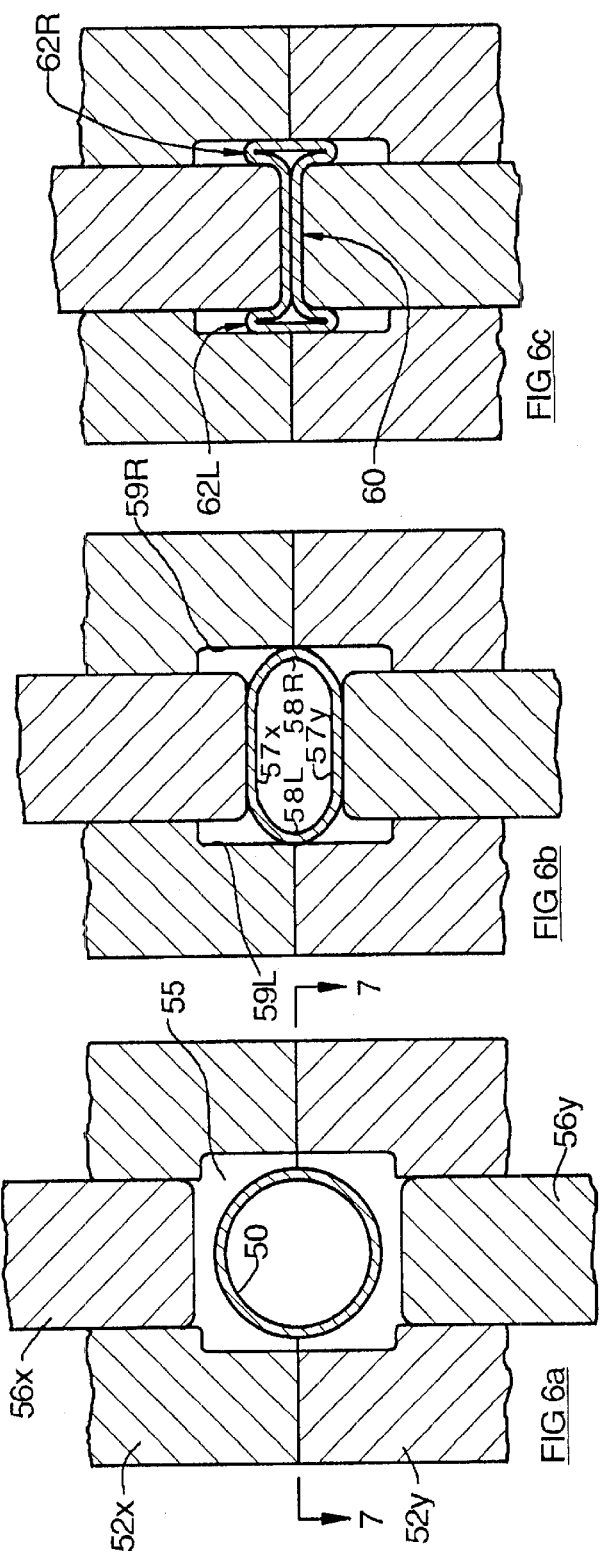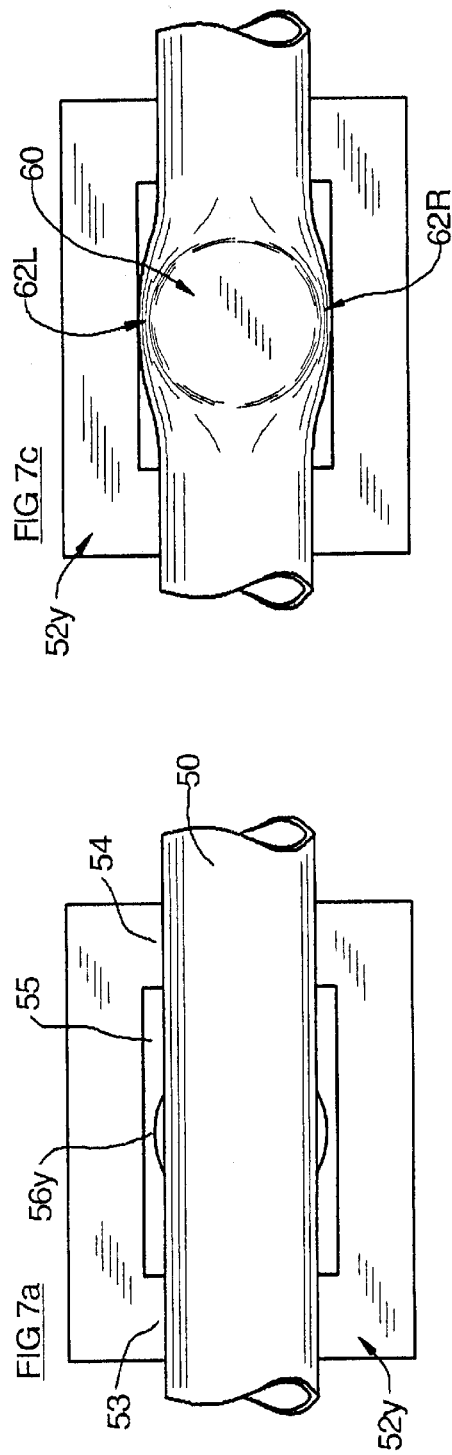

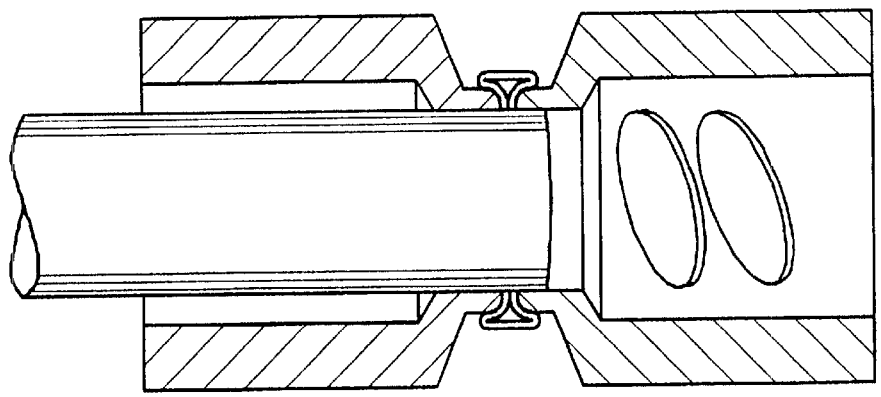
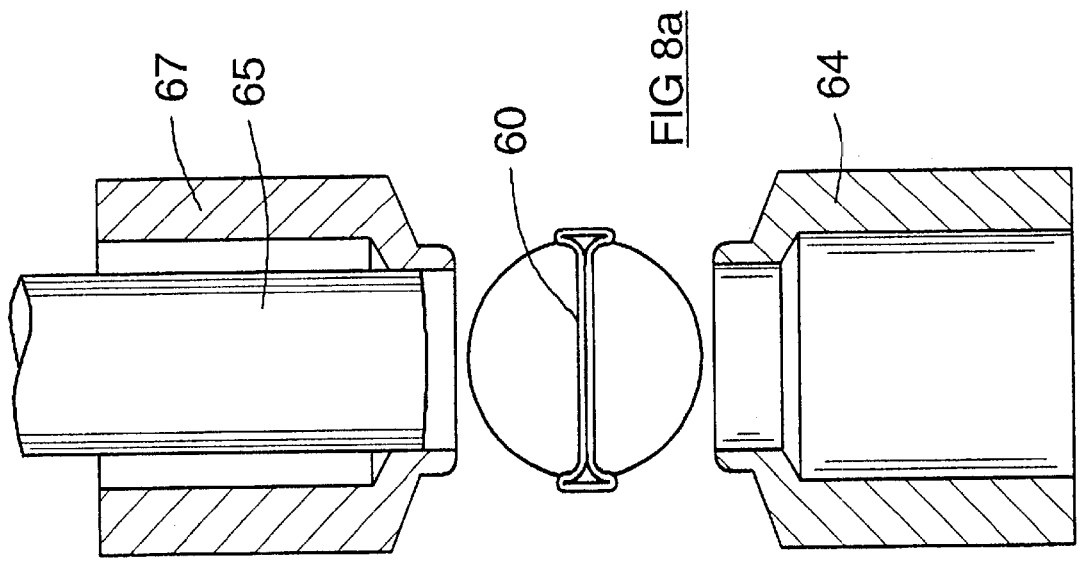
FIG 8a
FIG 8b

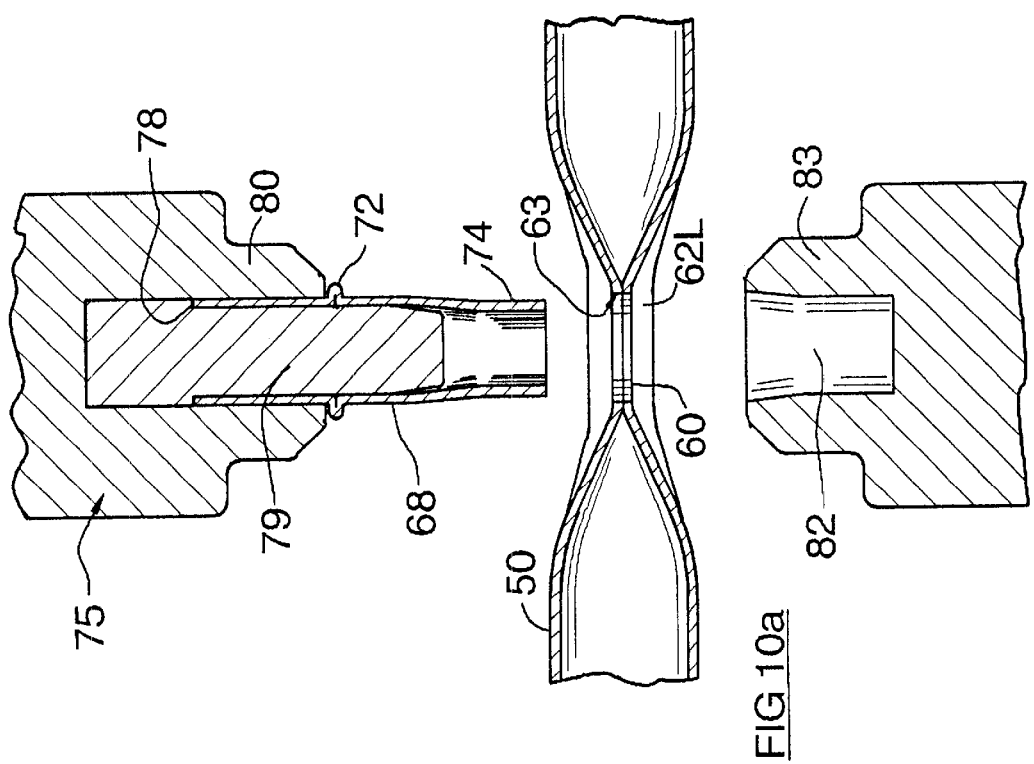
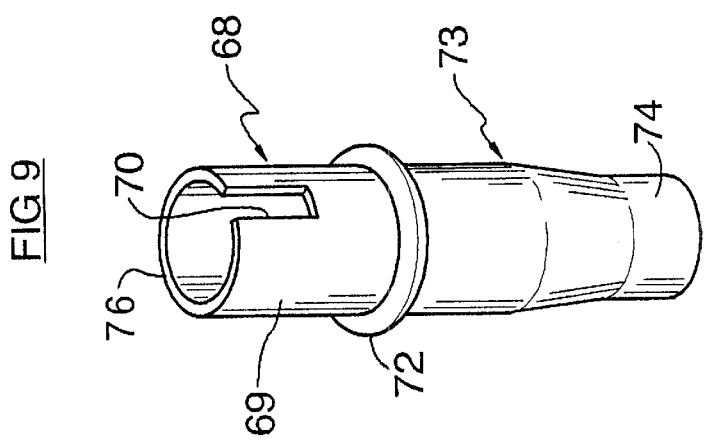

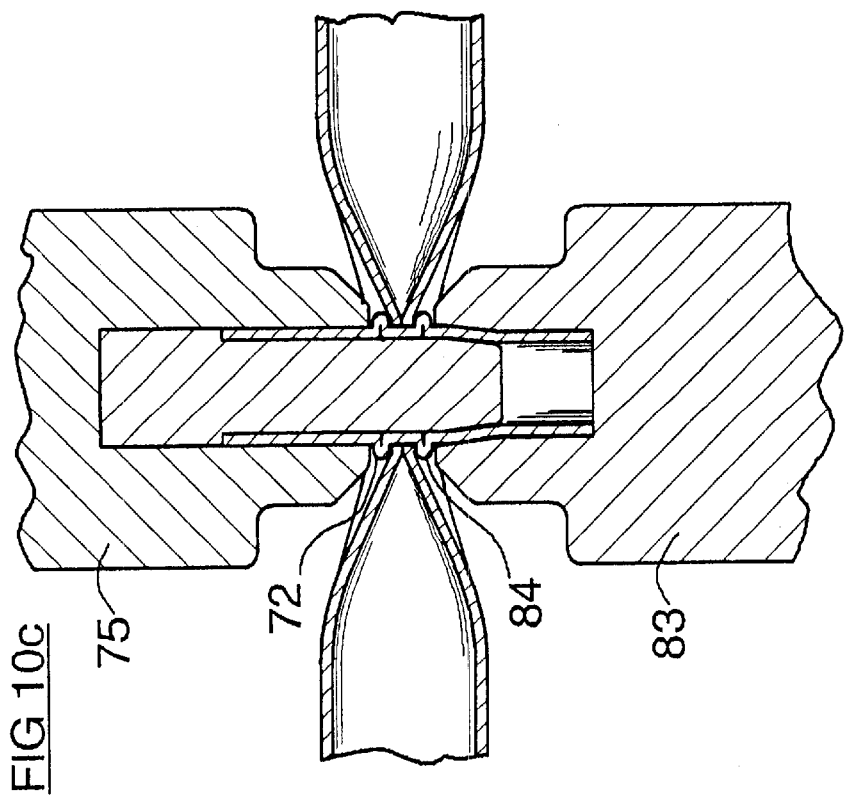
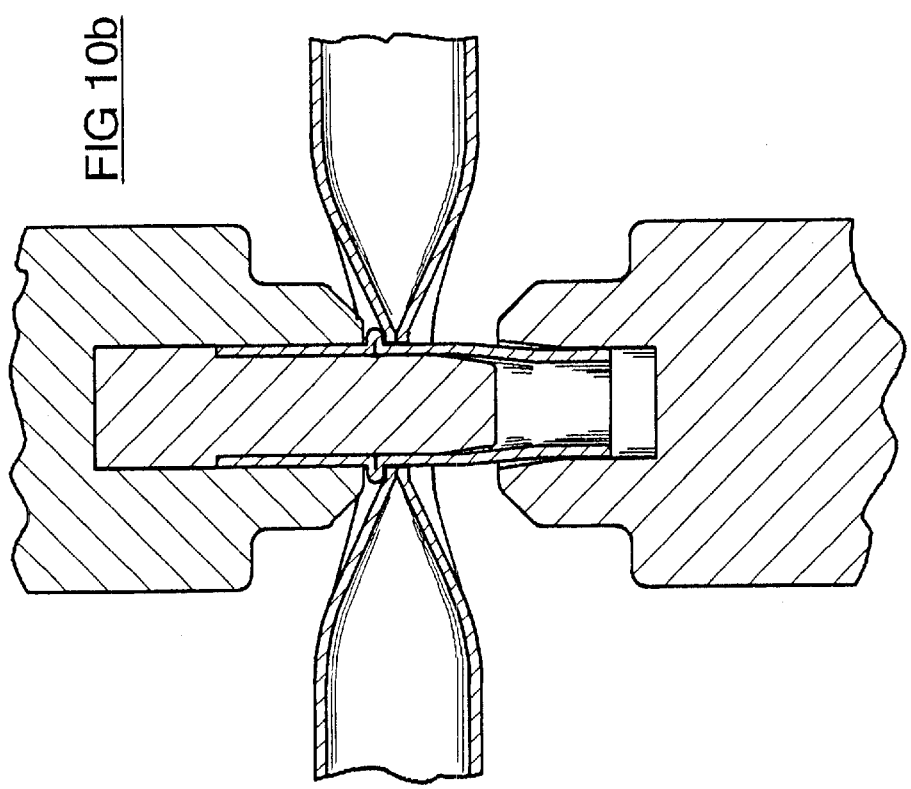

US 6,338,191 B1

SECUREMENT OF HEAD RESET SUPPORT INTO AUTOMOBILE SEAT FRAME

This is a continuation-in-part of patent application Ser. No. 09/064,620, filed Apr. 23, 1998, now U.S. Pat. No. 6,035,516

This invention relates to the construction of automobile seats, and is directed particularly to the manner of attachment of a headrest to the frame of an automobile seat.

BACKGROUND TO THE INVENTION

The headrest on an automobile seat is often made adjustable as to height. One common way in which the headrest is mounted on the seat in a way that permits height adjustment is for the headrest to be provided with two downwardly extending pegs, and the pegs engage sockets secured into the frame of the seat. Detent means are usually provided which interact between the pegs and the sockets, whereby the headrest may be set, by the occupant of the vehicle, at one of a number of pre-set heights.

The socket in which the peg is received comprises a metal tube. A plastic liner may be provided in the tube, to act as a bearing material for the peg. In the conventional system, the tube is welded to a bracket, and the bracket is welded to a frame piece of the seat. This manner of attachment, though secure enough (because it has to be secure by regulation), unfortunately is expensive as to the labour time and the materials needed to make it that secure. Any securement system that involves welding tends to be labour-intensive and therefore expensive, besides being difficult to inspect and test. A welded system generally has to be over-engineered.

Also, welding does not lead to high accuracy. The need for accuracy of placement of the headrest on the seat is not high, although the accuracy of the spacing of the pegs and their sockets cannot be too far out; the conventional welded-on system is just about at the limit for accuracy for welding, which means that, when welding is used as the basis of the attachment method, skilled care has to be taken, which in turn does nothing to ease the cost problem.

The invention is aimed at providing a manner of securing a headrest support tube into a seat frame, in a manner that eases some of the compromises that have had to be resorted to in the conventional systems.

Typically, the operations carried out in a conventional seat manufactory include welding, bending of frame pieces, securing components together, and assembly, all of which tend to have a higher labour content. It is an aim of the headrest support system as described herein, to minimise the labour content of the task of attaching the support tubes to the seat frame piece.

Support tubes for headrests are conventionally attached to the seat frame piece by welding a bracket onto the frame piece, and then welding the tube to the bracket. Sometimes, the tube is pressed into holes in the welded-on bracket; but welding is nearly always resorted to, to assure that the tube remains in position on the bracket. Of course, the tubes can be attached securely enough, but the conventional costs of ensuring that security are high.

GENERAL FEATURES OF THE INVENTION

The invention lies in the manner of attaching the headrest-support-tube. First, the headrest-support-tube is provided with a first ring, in which the metal of the headrest-support-tube is expanded radially outwards. The headrest-support-tube is assembled into a hole in the web of the seat-frame-piece, with the first ring abutting against the web.

The frame-piece, with the headrest-support-tube resting therein, is placed in the die of a punch and die set, with the first ring in the die. The punch then is brought down over the other end of the headrest-support-tube, and a second ring is formed on the other side of the web. When the punch is withdrawn, the web lies gripped between the two rings. Usually, another headrest-support-tube is inserted into the frame-piece, in a similar manner. Then, the seat-frame piece is assembled into a seat, and finally the pegs of the headrest are inserted into the headrest-support-tubes.

THE PRIOR ART

As mentioned, headrest-support tubes are attached to the seat-frame-piece by welding. Sometimes, designers have specified intermediate brackets, rather than just welding the tube to the frame piece.

Techniques for mounting a tube into a through-hole in a piece of sheet metal are commonplace, per se. The broad range of options available include bulk-head fittings generally. Such fittings have included cases where a first bead is provided on the tube on one side of the sheet, then a second bead is swaged into the tube after the tube has been inserted into the through-hole. The technique is commonly known as lock-beading.

In cases where bulk-head fittings are being designed, a common requirement is that the fitting be air- or liquid-tight. It is recognised that the lock-beading technique is not suitable for such cases. It is recognised that lock-beading is highly suitable for cases where mechanical integrity is paramount, rather than sealing. It is also recognised that lock-beading is highly suitable for cases where access to the beads is only to be had from an axial direction, such as a case where flat-access to the through-hole is denied because the through-hole is surrounded by raised flanges.

DETAILED DESCRIPTION OF PREFERRED EMBODIMENTS

By way of further explanation of the invention, exemplary embodiments of the invention will now be described with reference to the accompanying drawings, in which:

FIGS. 6a, 6b, 6c are cross-sections of a tooling arrangement for forming a metal tube locally into an I-section beam;

FIGS. 7a, 7c are views on the line 7—7 of FIG. 6a, corresponding to the conditions shown in FIGS. 6a and 6c respectively;

FIGS. 8a, 8b are cross-sections of a hole-punching arrangement, for making a through-hole in the web of the I-beam produced as in FIG. 6c;

Figure 11:
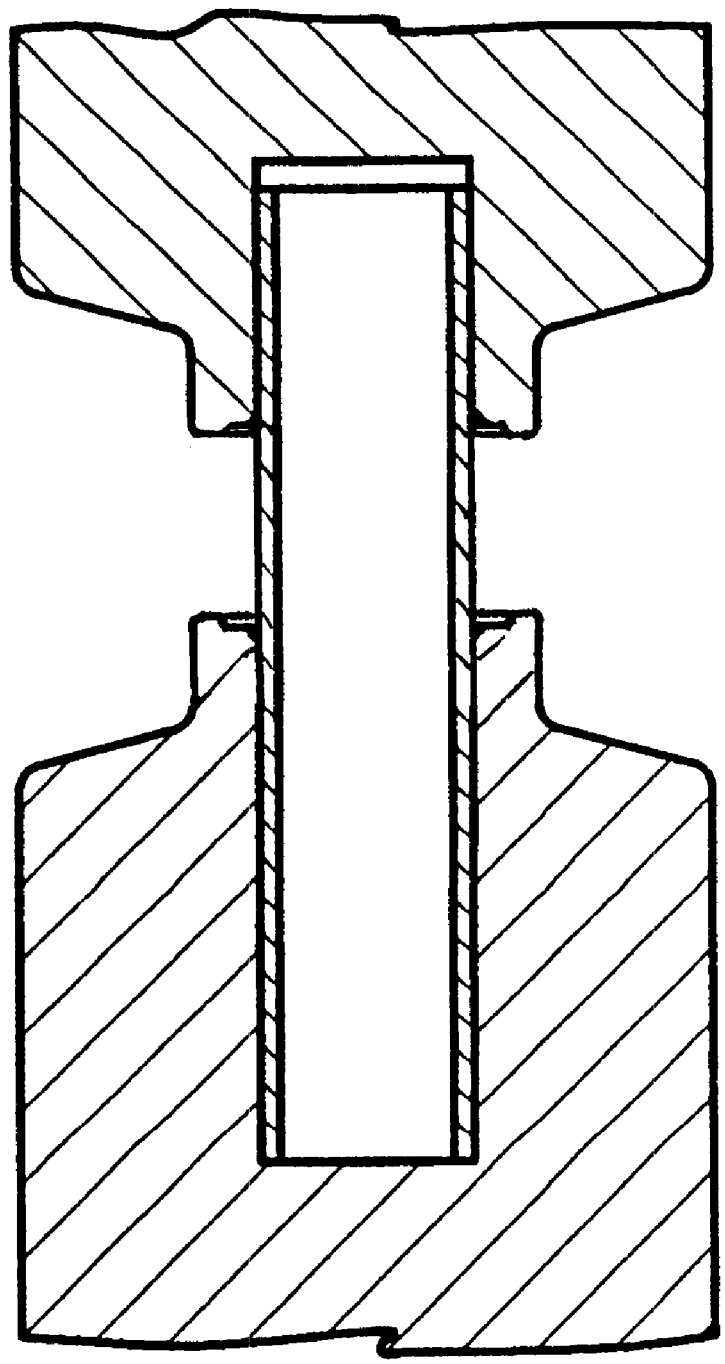

is FIG. 9 is a view of a headrest-support-tube, shown prior to final forming;

FIGS. 10a, 10b, 10c are cross-sections of a tooling arrangement for ring-bead-locking the headrest-support-tube of FIG. 9 into the through-hole in the web of the I-beam;

FIG. 11 is a cross-section of a tooling arrangement for forming a first ring-bead onto a headrest support-tube.

The apparatuses shown in the accompanying drawings and described below are examples which embody the invention. It should be noted that the scope of the invention is defined by the accompanying claims, and not necessarily by specific features of exemplary embodiments.

Figure 1:
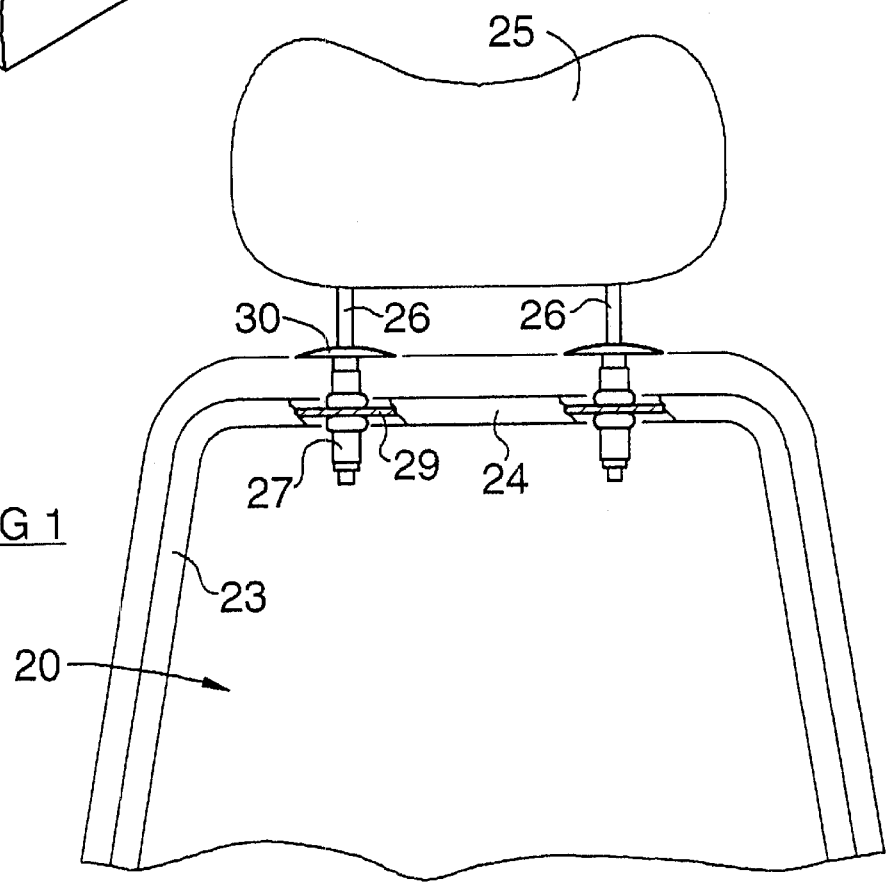
FIG. 1 is a diagram of an automobile seat frame, shown partly in cross-section, carrying a headrest which is mounted in a manner in accordance with the invention.

FIG. 1 shows an automobile seat 20, having a seat frame piece 23. In this case, the seat frame piece 23 made from a length of extruded I-section aluminum. The seat frame piece is bent generally into an inverted U-shape, as shown, in which the horizontal rail 24 of the U-shape forms the horizontal top rail of the seat.

The headrest 25 of the seat 20 is formed with two pegs 26, which protrude downwards, as shown. The pegs engage into support tubes 27, which are integral with the frame of the seat. The support tubes 27 are fixed firmly to the horizontal rail 24, and in fact the support tubes pass through holes 28 in the web 29 of the I-section that forms the rail 24 (see FIG. 2).

Figure 5:
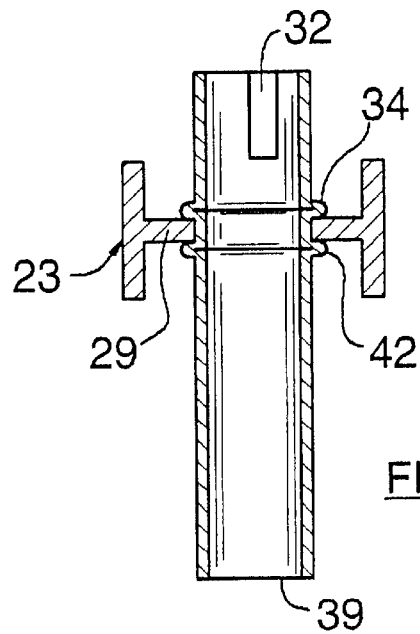
FIG. 5 is a cross-section of the headrest mounting support, shown at a later stage.

The invention is concerned with the manner of attaching the support tubes 27 into the holes 28 in the web 29 of the I-section. Usually, headrests are adjustable as to vertical position, and the adjustment is effected by moving the headrest, with its two pegs 26, vertically up or down within the tubes 27. The designer can provide a plastic sleeve 30, which is inserted into the support tube to provide a bearing for guiding the pegs for up/down adjustment movement. The designer can provide the pegs with detents (not shown), which interact with the plastic sleeves 30, or with the tubes 27, in order to define some vertical positions to which the headrest might be set. It is usually necessary to align the plastic sleeve orientationally with respect to the tube, and the plastic sleeve can be moulded with a tongue for engagement with a notch 32 (FIG. 5) in the tube, for this purpose.

Figure 2:
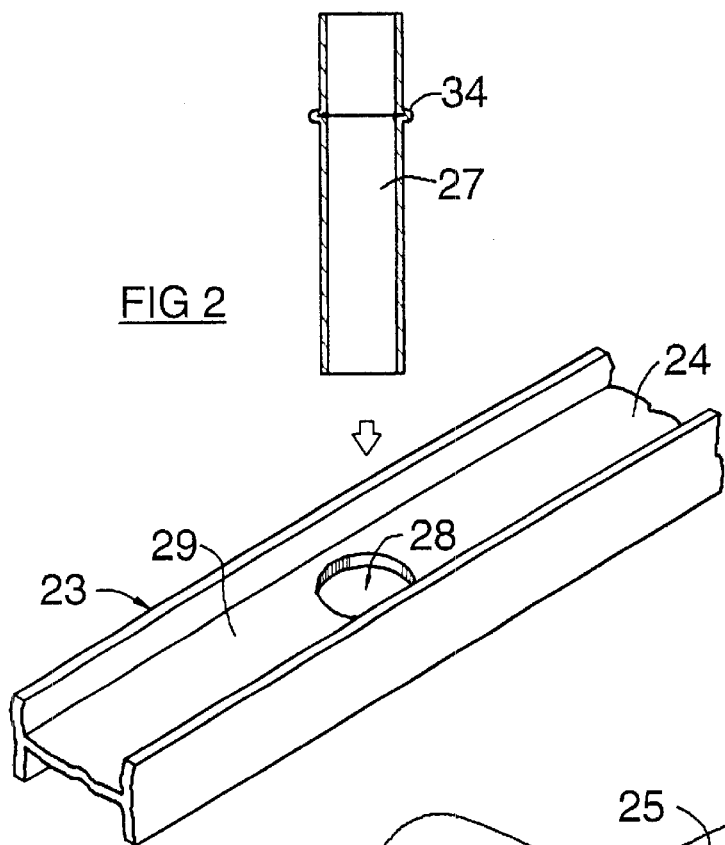
FIG. 2 is a view of some of the components that support the headrest, shown at a preliminary stage of manufacture.

In order to manufacture the seat frame, with the headrest support tubes 27 attached, first the tubes are formed with a single first swaged-out ring 34. The tube in this state is as shown in FIG. 2.

The swaged-out ring 34 is formed by pressing the ends of a plain length of tubing axially, and confining the walls thereof everywhere but at the place where the ring is to be formed. It may be noted that this first operation is carried out on the tube when only the tube itself is present, i.e in the absence of any other components. The operation of forming the first ring is of low labour content, and can be easily automated.

The job of attaching the tube 27, with its first swaged-out ring 34, into the hole 28 in the web 29 of the I-section, can also be fully automated, as can the job of swaging the first ring into the tube. This may be compared with the job of welding a bracket onto the frame piece, and then locating a tube into holes in the bracket, and then welding the tube to the bracket, in which the labour content is inevitably high.

Figure 3:
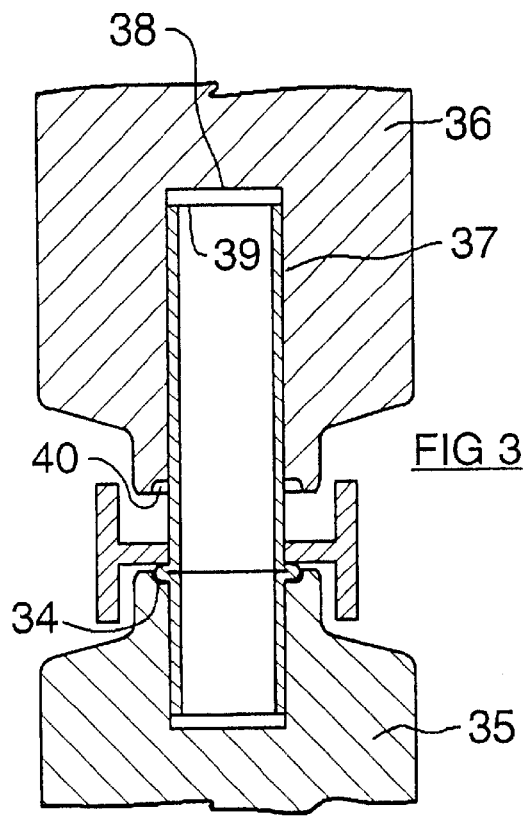
FIG. 3 is a view of a punch and die set-up, which is used at a stage in the manufacture of one of the headrest supports.

FIG. 3 shows the tube 27, with its first swaged-out ring 34, resting in a die 35. The seat frame piece 23 has been placed over the tube 27, with the web 29 resting against the first ring 34. A punch 36 is advanced, and a hole 37 in the punch slides over the upper portion of the tube 27. When the end of the hole 38 bottoms against the end 39 of the tube 27, further movement of the punch causes the upper portion of the tube to be compressed. A recess 40 in the punch allows the metal of the tube to expand outwards, in response to the axial force, with the result that the action of the punch causes a second ring 42 to be formed in the tube.

Figure 4:
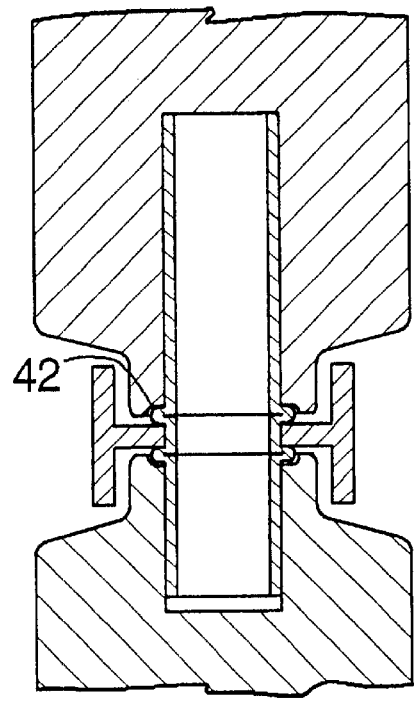
FIG. 4 is a view corresponding to FIG. 3 of another stage during manufacture.

FIG. 4 shows the situation when the punch and die are (almost) closed fully together. It will be seen from FIG. 4 that the web 29 is not contacted by either the die 35 or the punch 36 during the operation of swaging out the second ring 42. At the very end of the operation, the designer might provide that the web is in fact subjected to a squeeze between the punch and die, as a coining phase to ensure everything is straight; but in general, throughout the pressing stages indicated in FIGS. 3 and 4, the web 29 floats. As the pressing operation is nearing completion, the press forces also act on the first ring 34, and cause that to be consolidated and even coined.

The hole 28 in the frame piece is a clearance fit over the diameter of the tube 27, and so the frame-piece is not held in position, during the FIG. 4 operation, by being held by a tight fit on the tube 27. Therefore, the frame-piece 23 does need to be held—at least loosely—to prevent tipping thereof. However, that kind of holding is simple enough—at least when compared with securing the components in welding jigs.

It is important, during the FIG. 4 pressing operation, that the web 29 remain resting in close touching contact with the first ring 34. In an automated system, the designer should ensure that the components are presented properly to each other for the operation. Seat-frame-pieces can include bends and twists, and be of an awkward shape, but the designer can provide the holding-clamps etc to accommodate whatever shape the seat-frame-pieces are in. The designer can decide whether to insert the head-rest-support-tubes into the seat-frame-piece before or after the seat-frame-piece is bent and twisted to its final shape.

The designer should ensure that, whatever the configuration of the components, the web can and does rest properly (i.e in firm abutment) against the first ring during the operation of pressing the second ring: if there were to be some clearance between the web and the first ring during pressing, the final joint would be significantly less tight and secure. The ideal is that the web should be under some degree of residual compression after the punch and die have separated, even if only slightly, and that can only happen if the web remains cleanly in abutment against the first ring throughout the pressing operation.

In an alternative, the die and punch set may be arranged with a subsidiary actuable member, which loads the web tightly against the first ring while the forming of the second ring is taking place.

It is important also that the clearance between the hole 28 in the web and the diameter of the tube 27 be taken up during the pressing operation. The force that causes the metal of the tube to swell out to form the second ring 42, of course also causes the metal to swell out to fill the clearance at the hole 28. Generally, the filling of the hole 28 is so good that any crannies etc caused by burrs or other malformations arising from the punching of the hole 28, are filled completely and tightly.

The manner as described above of attaching the headrest support tubes to the seat frame provides a very secure attachment, which is amply able to accommodate the forces and abusive forces encountered in automotive seating equipment. The material costs are somewhat reduced, and the labour costs are very much reduced, as compared with what has to be done in the conventional tasks of welding the tubes to the frames.

It is conventional for the frames of automobile seats to be made from steel tubing. The head-rest-support-posts can be attached into a tubular-steel seat-frame in the manner as will now be described.

FIGS. 6a, 6b, 6c are views directed axially along the length of the seat-frame-tube 50, and show three stages in the preparation of the seat-frame-tube. FIGS. 7a, 7c are views corresponding to FIGS. 6a, 6c in the direction of arrows 7—7 of FIG. 6a.

In FIG. 6a, the seat-frame-tube 50 has been gripped on its outside diameter between two dies 52x, 52y. The dies are dimensioned to grip the seat-frame-tube at two spaced locations 53, 54. The dies 52x, 52y are shaped so as not to directly grip the seat-frame-tube 50 in the recess 55 between the locations 53, 54.

Once the dies 52x, 52y are in contact, and the seat-frame-tube 50 is firmly held, the two formers 56x, 56y are advanced. At first, the seat-frame-tube 50 is flattened, as shown in FIG. 6b. As the upper and lower zones 57x, 57y of the tube walls are forced together, the left and right side-zones 58L, 58R are forced apart, and these zones of the walls come into contact with the sides 59L, 59R of the recess 55.

The formers 56x, 56y are advanced until they bottom against the two thicknesses of the wall-zones 57x, 57y, as shown in FIGS. 6c, 7c. The wall-zones 58L, 58R are formed to the shape as shown by virtue of their confinement by the sides 59L, 59R of the recess 55. It will be noted that this manner of forming the seat-frame-tube produces a localised shape which is similar to that of an I-beam. The web 60 of the I-beam shape is derived from the wall-zones 57x, 57y, and the flanges 62L, 62R of the I-beam are derived from the folded wall-zones 58L, 58R.

It is noted that the seat-frame-tube 50 is not simply squashed flat. The operations as described produce a configuration that is much stronger and more rigid than a flattened tube. The flanges 62L, 62R, being tall (i.e the height of the flanges is equal to several thicknesses of the walls of the tube), are crucial to the rigidity of the tube against bending forces, which of course is an important consideration in a seat frame.

A hole 63 for receiving the head-rest-support-tube is punched in the web 60 of the seat-frame-tube, in the manner as shown in FIGS. 8a, 8b. A die-button 64 is brought into contact with one side of the web 60. A punch 65, carried in a stripper 67, is advanced, and pierces the hole 63 in the web. The die-button 64 and the stripper 67 are dimensioned to hold the web 60 to its desired shape during the disruption caused by the punching operation and subsequent stripping of the web from the punch 65.

The head-rest-support-tube 68 that is to be secured into the hole 63 in the web 60 is shown in FIG. 9. The head-rest-support-tube 68 is of steel, and includes an upper section 69, in which is cut a notch 70, a first ring-bead 72, and a lower section 73, the bottom section 74 of which is swaged down to a slightly smaller diameter than the rest of the head-rest-support-tube. The inside diameter of the bottom section 74 is dimensioned to be a tight location-fit on the peg 26 of the head-rest, and the reduced outside diameter of the bottom section 74 ensures an easy placement of the head-rest-support-tube 68 into the hole 63 in the web 60 of the seat-frame-tube 50.

The manner of installing the head-rest-support-tube 68 into the hole 63 is illustrated in FIGS. 10a,10b,10c. The head-rest-support-tube is first positioned into a punch unit 75. The top end 76 of the head-rest-support-tube abuts against a shoulder 78 of the punch 79, and the already-formed first ring-bead 72 abuts against the bottom face of the punch-holder 80.

As shown in FIG. 10b, the head-rest-support-tube passes through the hole 63, and the tapered bottom end of the head-rest-support-tube enters the recess 82 in the die 83. As the punch 75 and die 83 approach, the bottom end of the head-rest-support-tube abuts against the bottom of the recess 82. From then on, further approaching movement of the punch and die are reacted as an axially-directed compressive force on the head-rest-support-tube. The compressive force is enough to cause the walls of the headrest-support-tube to buckle outwards, whereby the second ring-bead 84 is formed. Approaching movement of the punch and die continues until the condition of FIG. 10c is reached.

The punch and die are then withdrawn, and the seat-frame-tube 50, with the head-rest-support-tube 68 now firmly attached, can be transferred to the next stage in the manufacture of the seat.

The manner of attaching the head-rest-support-tube into the seat-frame-tube ensures that the web 60 is structurally unitary with the head-rest-support-tube. The first and second ring-beads 72, 84 grip the web between them, providing a secure base for resisting abusive forces from any direction, which might tend to disrupt the attachment.

By forcing the punch unit 75 and the die 83 hard together (FIG. 10c) the amount of spring-back upon release can be made very small, whereby the compressive grip on the web is still firmly present upon release.

The manner in which the dies bottom together may be explained further, as follows.

To manufacture the first ring-bead in the headrest-support-tube, the tube is placed between a pair of dies, which apply compressive force to the tube via the top-end-surface and the bottom-end-surface of the tube. That is to say, the whole length of the tube is in compression. The dies are so shaped as to include an annular recess at the location where the ring-bead is to be formed. As the dies are forced together, the tube collapses axially, and the walls expand radially outwards, into the recess. The tube is now taken out of the dies in which the first ring-bead was formed. With its one ring-bead, the headrest-support-tube looks like FIG. 9.

The headrest-support-tube, with the first ring-bead formed thereon, is placed in the through-hole that has already been punched through the web of the I-section of the top-rail (which can be either an I-beam itself, or a round tube that has been locally formed into an I-beam configuration). The dies are arranged so that the already-formed first ring-bead abuts a shoulder in the upper die; the lower die abuts the headrest-support-tube at its lower-end-surface.

As the dies are pressed together, the tube expands into the recess that is formed between the upwards-facing shoulder on the lower die, and the undersurface of the web, to form the second ring-bead.

Once the metal of the tube starts to expand into the recess, and to form upper and lower wall portions of the second ring-bead, so the upwards-facing shoulder on the lower die starts to compress the upper and lower wall portions of the second bead together, and to compress the second bead itself, between the shoulder and the under-surface of the web.

The ring-beads now form a stack, which is under the compression of the die-set. That is to say, the downwards-facing upper-die-shoulder lies flat against the upwards-facing outside surface of the upper-wall-portion of the 1st ring-bead; the downwards-facing inside surface of the upper-wall-portion of the 1st ring-bead lies flat against the inside surface of the lower-wall-portion of the 1st ring-bead; the downwards-facing outside surface of the lower wall portion of the 1st ring bead lies flat against the upwards-facing surface of the web of the top-rail; the downwards-facing surface of the web of the top-rail lies flat against the upwards-facing surface of the upper-wall portion of the second ring-bead; the downwards-facing inside surface of the upper-wall-portion of the second ring-bead lies flat against the upwards-facing inside surface of the lower-wall-portion of the second ring-bead; and the downwards-facing outside surface of the lower-wall-portion of the second ring-bead lies flat against the upwards-facing lower-die-shoulder.

The surfaces, one on top of another, lie in series and form a stack. The dies are arranged so that the compressive force delivered by the dies is applied to that stack. The designer should see to it that nothing else in the dies bottoms, in such manner as to prevent the full force with which the dies are brought together from being applied to the stack of surfaces.

The force applied to the surfaces is enough to crush and deform the metal, whereby any (slight) promontories or crannies in the surfaces are crushed, and the surfaces are brought into conformance with each other. The surfaces are crushed and squashed together so hard that, when thew force is released, the surfaces substantially do not spring apart and separate. Of course, given that the force is released, the surfaces must relax to some extent: the point is that the force with which the dies are pressed together is large enough for the surfaces to be crushed so hard together that the metal forming the surfaces is permanently deformed. Permanent deformation occurs when the metal has been compressed to its elastic limit, and the metal is also under a heavy elastic deformation.

With the configuration of the surfaces as depicted, it has been found that the stored resilient compression of the metal, at the time the permanent deformation of the surfaces takes place, is enough to retain a compressive force between the ring-beads and the web. Thats is to say, when the die force is released, and the surfaces tend to spring apart, there is enough resilient energy stored in and locked into the stack, that the surfaces do not actually separate, but remain under compression, whereby the headrest-support-tube remains locked firmly to the top rail of the seat frame, and does not tend to work loose.

The head-rest-support-tube might be subjected to forces tending to rotate it, during use of the automobile, and it is important that rotation forces are resisted. If rotation of the head-rest-support-tube were to be permitted, the movement might cause the attachment to rattle or work loose. Accordingly, the designer might prefer to make the hole 63 in the web slightly non-circular. In fact, given the fact that the hole occupies a large area of the tube, it is all too easy for the hole 63 to be non-circular in any event. The operation of forming the second ring-bead 84, however, ensures that the head-rest-support-tube adapts itself completely to whatever out-of-roundness there might be in the hole 63, which helps to ensure freedom from rotation of the head-rest-support-tube.

The attachment system as described is very strong, as compared with the conventional welded construction, but apart from that clear advantage, the attachment system provides excellent and repeatable accuracy. Now that accuracy of alignment of the two head-rest-support-tubes can be relied upon, the design of the head-rest detents can be free of the compromises needed with the conventional welded attachment; designing a detent is a matter of making sure the force to move the head-rest pegs against the detent is neither too light nor too heavy, and the more accurately the components can be positioned, the easier it is to ensure the correct force.

Not only is the attachment system as described very strong, and accurate, but the system also lends itself to full automation. The attachment system is in keeping with the kinds of operations that have to be carried out on seat-frame-tubes, such as bending, piercing, etc, and the machinery for automating such operations is already commonplace. The similarity of those frame-tube operations with the operations required in the attachment system will be clear: the dissimilarity of the frame-tube operations with the conventional welding attachment system, is even more clear.

The expressions upper, lower, horizontal, vertical, etc, as used in this specification, should not be interpreted to mean that the invention only applies when the actual physical components used in operating the invention are orientated in only that way. Rather, the expressions should be taken as referring to those directions when the components are represented on paper, which is oriented accordingly.

What is claimed is:

1. Procedure for attaching a headrest-support-tube, being of a ductile metal, to an elongate frame-piece comprising a top rail of an automobile seat, including:

providing the headrest-support-tube with a first ring-bead, in which the metal of the headrest-support-tube is expanded radially outwards;

providing the top-rail of the seat-frame-piece in the configuration of an I-beam, being a configuration that comprises a web between two flanges;

providing a through-hole in the web of the top-rail, the through-hole being a clearance fit over the headrest-support-tube;

making a sub-assembly by placing the headrest-support-tube in the through-hole in the top-rail, in such a manner that the first ring-bead abuts one side of the web of the top-rail;

providing a die-set;

placing the sub-assembly comprising the headrest-support-tube and the seat-frame-piece in the die-set;

arranging the die-set so as to confine the headrest-support-tube against radial expansion, except in the region of the headrest-support-tube that lies immediately contiguous with the web of the top-rail, being a region on the other side of the web from the side against which abuts the first ring-bead;

applying a heavy compressive force to the die-set, to compress the headrest-support-tube axially therein, while the headrest-support-tube remains in the hole in the web of the top-rail, and the first ring-bead remains in abutment with the one side of the web, the axial direction being the direction of the axis of the through-hole in the web of the top-rail;

compressing the headrest-support-tube with enough force whereby the metal of the headrest-support-tube expands outwards in the said region, and forms a second ring-bead on the headrest-support-tube, and whereby the second ring-bead lies in direct contact with the web, on the other side of the web;

taking the sub-assembly out of the die-set, leaving the web of the top-rail gripped between the first and second ring-beads.

2. Procedure of claim 1, wherein:

the die-set includes an upper-die having a downwards-facing upper-die-shoulder, and a lower-die having an upwards-facing lower-die-shoulder;

the first ring-bead of the headrest-support-tube includes an upper-wall-portion having an inside surface, and a lower-wall-portion having inside and outside surfaces;

the second ring-bead of the headrest-support-tube includes an upper-wall-portion having an inside surface, and a lower-wall-portion having inside and outside surfaces.

3. Procedure of claim 2, including compressing the headrest-support-tube with enough force that the first ring-bead is squashed flat, in that the inside surface of the upper-wall-portion of the first ring-bead is squashed flat against the inside surface of the lower-wall-portion of the first ring-bead, and the second ring-bead is squashed flat, in that the inside surface of the upper-wall-portion of the second ring-bead is squashed flat against the inside surface of the lower-wall-portion of the second ring-bead.

4. Procedure of claim 3, wherein the arrangement of the die-set is such that, when the die-set is compressed, the shoulders compress the first and second ring-beads flat against the web, above and below the web, before the die-set otherwise bottoms.

5. Procedure of claim 4, including forcing the two ring-beads together onto the web of the top-rail with enough force that the outside surface of the lower-wall-portion of the second ring-bead lies squashed flat against the upwards-facing surface of the web, and the outside surface of the upper-wall-portion of the first ring-bead lies squashed flat against the downwards-facing surface of the web.

6. Procedure of claim 5, including compressing the headrest-support-tube with enough force that the said surfaces are squeezed and squashed against each other, the inside surface of the upper-wall-portion of the first ring-bead against the inside surface of the lower-wall-portion of the first ring-bead, the outside surface of the lower-wall-portion of the first ring-bead against the upwards-facing surface of the web, the downwards-facing surface of the web against the outside surface of the upper-wall-portion of the second ring-bead, the inside surface of the upper-wall-portion of the second ring-bead against the inside surface of the lower-wall-portion of the second ring-bead, to the extent that the metal of the surfaces themselves is crushed and distorted, and undergoes a permanent deformation, whereby, when the compression force is released, the metal surfaces substantially do not spring apart, but remain substantially in contact.

7. Procedure of claim 2, wherein:
the procedure includes so arranging the headrest-support-tube in the through-hole in the web of the top-rail, and so arranging the headrest-support-tube and the top-rail in the die-set, that:
the downwards-facing upper-die-shoulder lies flat against the upwards-facing outside surface of the upper-wall-portion of the first ring-bead;
the downwards-facing inside surface of the upper-wall-portion of the first ring-bead lies flat against the inside surface of the lower-wall-portion of the 1st ring-bead;
the downwards-facing outside surface of the lower wall portion of the first ring bead lies flat against the upwards-facing surface of the web of the top-rail;
the downwards-facing surface of the web of the top-rail lies flat against the upwards-facing surface of the upper-wall portion of the second ring-bead;
the downwards-facing inside surface of the upper-wall-portion of the second ring-bead lies flat against the upwards-facing inside surface of the lower-wall-portion of the second ring-bead;
the downwards-facing outside surface of the lower-wall-portion of the second ring-bead lies flat against the upwards-facing lower-die-shoulder;
the said surfaces, being the upwards-facing outside surface of the upper-wall-portion of the 1st ring-bead, the downwards-facing inside surface of the upper-wall-portion of the first ring-bead, the inside surface of the lower-wall-portion of the first ring-bead, the downwards-facing outside surface of the lower wall portion of the first ring bead, the upwards-facing surface of the web of the top-rail, the downwards-facing surface of the web of the top-rail, the upwards-facing surface of the upper-wall portion of the second ring-bead, the downwards-facing inside surface of the upper-wall-portion of the second ring-bead, the upwards-facing inside surface of the lower-wall-portion of the second ring-bead, and the downwards-facing outside surface of the lower-wall-portion of the second ring-bead, thereby forming a stack of surfaces, between the downwards-facing upper-die-shoulder and the upwards-facing lower-die-shoulder;

the arrangement of the die-set is such that, when the upper-die-shoulder and the lower-die-shoulder are compressed together with a heavy force, the force is reacted through the stack of surfaces;

the die-sot is so arranged that, as the die-set closes, the upper-die and the lower-die cannot bottom together and thereby prevent the said heavy force from being reacted through the stack of surfaces;

the procedure includes so compressing the die-set that the upper-die-shoulder and the lower-die-shoulder are compressed together with a heavy force;

the said force is heavy enough that the stack of surfaces is compressed, as a serried stack, until the surfaces are squeezed and squashed one against the other to the extent that the metal of the surfaces themselves is crushed and distorted, and undergoes a permanent deformation, whereby, when the compression force is released, the metal surfaces substantially do not spring apart, but remain substantially in contact.

8. Procedure of claim 7, wherein, before forming the said stack of surfaces:
the procedure includes forming the first ring-bead on the headrest-support-tube first, as a separate operation;
and doing so by compressing the headrest-support-tube axially, from the ends thereof, whereby substantially the whole length of the tube is in compression; by arranging dies to confine the tube diametrally except at the location where the first ring-bead is to be formed; by compressing the tube axially until the walls of the tube start to expand at the said location, continuing compression until the first ring-bead is formed;
the procedure includes then placing the headrest-support-tube in the through-hole in the web of the top-rail, with the first ring bead underneath the web;
the lower die is shaped such that, when the upper and lower dies are forced together, the lower die applies force to the headrest-support-tube via the upwards-facing lower-die-shoulder, which is in contact with the downwards-facing surface of the first ring-bead of the headrest-support-tube;
the upper die is so shaped as to apply force to the headrest-support-tube via the top-end-surface of headrest-support-tube;
as the headrest-support-tube is compressed, the second ring-bead starts to form by radial expansion of the walls of the headrest-support-tube between the downwards-facing upper-die-shoulder and the upwards facing surface of the web of the top rail;

as the walls of the tube expand, upper and lower wall-portions of the second ring-bead start to form;

and the procedure includes continuing to force the upper and lower dies together until the upwards-facing surface of the upper-wall-portion of the second ring-bead starts to make contact with, and to lie flat against, the downwards-facing upper-die-shoulder, and until the downwards-facing surface of the lower-wall-portion of the second ring-bead starts to make contact with, and to lie flat against, the upwards-facing surface of the web.

9. Procedure for preparing the top-rail of an automobile seat frame for the attachment thereto of a headrest-support-tube, wherein the top-rail comprises a hollow metal seat-tube, and the procedure includes:

providing a die-set, and securing the seat-tube therein, oriented in a horizontal sense;

wherein the die-set includes formers, which are so shaped that, when the formers are brought together in a vertical direction, the formers squeeze opposed upper and lower zones of the wall of the seat-tube together, to form a walls-touching-area of the top-rail;

wherein the formers are so shaped that, when the formers are brought together in a vertical direction, left and right side-zones of the seat-tube walls remain clear of the former in the vertical sense, and the left and right side-zones of the seat-tube wall are thereby not squeezed together in the vertical sense, but are left substantially upstanding;

forcing the formers together, whereby the subsequent cross-sectional configuration of the upstanding left and right side-zones of the seat-tube wall, in relation to the walls-touching-area of the seat-tube wall, is that of an I-beam, having left and right side-flanges and a web straddling therebetween;

after the upper and lower portions of the seat-tube wall have been squeezed together, over the walls-touching-area of the seat-tube, then making a hole right through the walls-touching-area, the through-hole being through both the upper and lower zones of the seat-tube wall; and inserting the headrest-support-tube in the through-hole.

10. Procedure of claim 9, wherein the formers are so structured, and are so arranged in the punch and die set, that the walls-touching-area of the top-rail is localised to a zone of the top-rail that is marginal to the headrest-support-tube, and the remainder of the seat-tube beyond the said marginal zone remains substantially un-compressed.

11. Procedure of claim 9, including making the through-hole by punching.

12. Procedure of claim 11, wherein the die-set includes a hole-punch for punching the through-hole, and the hole-punch is located concentrically inside one of the formers.

* * * * *